Feb. 2, 1954   J. J. BROPHY ET AL   2,668,133
ADHESIVE BONDING PROCESSES
Filed April 13, 1953

Inventors
John J. Brophy
Robert R. Perron
By their Attorney

Patented Feb. 2, 1954

2,668,133

UNITED STATES PATENT OFFICE 2,668,133

ADHESIVE BONDING PROCESSES

John J. Brophy and Robert R. Perron, Salem, Mass., assignors to United Shoe Machinery Corporation, Flemington, N. J., a corporation of New Jersey Application April 13, 1953, Serial No. 348,167

12 Claims. (Cl. 154—126)

This invention relates to a method of adhesively bonding parts, and more particularly to a method of bonding parts by activating a curable adhesive disposed between the attaching surfaces of the parts to be joined. This application is a continuation-in-part of our application Serial No. 249,992, filed October 5, 1951.

Present methods of adhesively bonding parts commonly involve the use of some form of heat for so-called "activation" of the adhesive, for example, to soften adhesive coatings on the attaching surfaces of parts to be bonded to permit coalescence of the coatings, or to drive off a solvent where it has been used for softening such coatings, or to initiate the setting reaction of a thermosetting adhesive.

Whether the heat is provided by conduction through the parts or by dielectric heating with a high frequency alternating field, the adhesive and the surrounding area of the parts must necessarily be brought to an elevated activation temperature. A large portion of the cycle of the bonding operation commonly is occupied by the period of time required to bring the adhesive up to the activation temperature. The resulting elevated temperature delays the establishment of a firm bond so that a "cooling-off" or "dwell" period is required before stress may be applied to the bond. In high-speed commercial bonding operations, this dwell time may represent another large portion of the operating cycle, and it is therefore desirable to eliminate the necessity for a dwell period following activation.

Accordingly an object of the invention is the provision of a method of bonding parts by activating an adhesive adapted to cure from an uncured condition in which little or no adhesion exists between the parts to a cured condition in which a strong bond is formed between the parts (herein referred to as a curable adhesive) in which method the activation is immediately effective.

Another object of the invention is the provision of a method of bonding parts in which the necessity for providing a dwell period following activation is substantially eliminated.

Heat activation of adhesives is frequently attended by considerable risk of damage to the associated materials. For example, normally moist leather is quite susceptible of damage by heat. In dielectric heating, this susceptibility is complicated by the fact that such leather has a dielectric loss factor in the same order of magnitude as, and frequently exceeding that of, the adhesives commonly used.

Accordingly another object of the invention is the provision of a method of bonding parts by activating a curable adhesive in which the risk of damaging the parts by the activating step is greatly diminished.

In accordance with a feature of the invention, there is presented a method of bonding parts by activating a curable adhesive disposed between the attaching surfaces in which the activation step comprises subjection of the adhesive to "materialistic radiation," for example, a beam of high-speed electrons. "Materialistic radiation" as used herein, consists of "material radiation" in the sense used in Pollard and Davidson, Applied Nuclear Physics, John Wiley & Sons 1942, pp. 10 et seq., and also X-rays and gamma rays.

In the method of our invention, little heat is evolved, substantially the only heat being from exothermic reaction of the adhesive, and there is no delay in the effectiveness of the activation. Also, need for a dwell period is substantially eliminated. Further, delicate or heat-sensitive materials, like leather, are substantially unharmed by the radiation during the short exposure required for activation.

Since a bond may be formed very rapidly, the method lends itself advantageously to bonding operations requiring a short interval between activation and the application of stress to the bond, for example, the bonding of parts only transitorily positioned or where the formation of a bond is advantageously time-related critically with other operations in a cycle of operations.

These and other features and advantages of the invention will best be understood from the following description taken in connection with the accompanying drawings in which.

Figure 1:
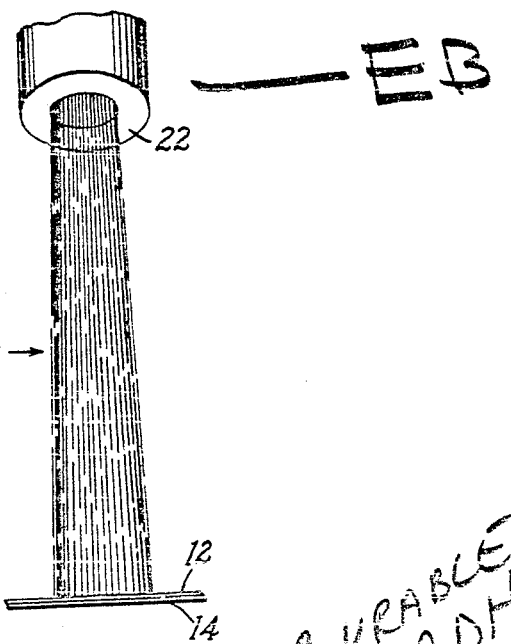
Fig. 1 illustrates diagrammatically the application of an electron beam to activate adhesive between two parts to be joined.
Figure 2:
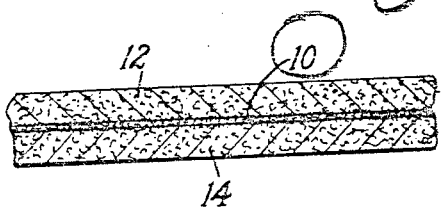
Fig. 2 is an enlarged sectional view through the parts shown in Fig. 1.

Referring to Figs. 1 and 2, a curable adhesive 10 has been disposed between and in engagement with the attaching surfaces of the parts 12 and 14.

Figure 3:
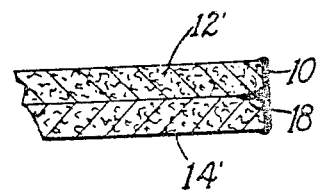
Fig. 3 is a sectional view showing another form of adhesive bond between two parts.

Referring to Fig. 2, a curable adhesive 10 is shown incorporated between the parts 12 and 14 to be bonded. The parts are here indicated as comprising leather strips. The adhesive may be applied in any convenient manner, for example by brush application to one or both the parts at the attaching surface. In the interfacial or sandwich type of bond shown in Fig. 2, the coated surfaces may then be pressed together so that the adhesive forms a connecting mass between the attaching surfaces of the parts. In the cap-type bond (Fig. 3) useful for joining parts at an edge, the parts 12' and 14' may be held together edge to edge while the adhesive 10 is applied in a continuous mass between and in contact with the parts around their edges. The adhesive will also tend to penetrate slightly into the edge interfaces 18, the extent of penetration depending largely upon the viscosity and surface tension of the adhesive.

Activation of the adhesive is shown diagrammatically in Fig. 1 wherein adhesive between the parts 12 and 14 is illustrated as being subjected to a beam 20 of electrons from a high-voltage apparatus 22. Apparatus of various types for providing a beam of such electrons is commerically available and being well known will not be described here. Two well-known types which may be employed in practising the invention are the microwave cavity electron accelerator exemplified by United States Letters Patent No. 2,582,186, issued January 8, 1952, on an application filed in the name of William E. Willshaw, and the direct current electron accelerator exemplified by United States Letters Patent No. 1,991,236, issued February 12, 1935, on an application filed in the name of Robert J. Van de Graaff. A commercial embodiment of the latter type is shown in Bulletin A–S of the High Voltage Engineering Corporation of Cambridge, Mass. Another type of direct current accelerator similar to the Van de Graaff machine and which may be employed in practising the invention is disclosed in the Journal of Applied Physics, volume 19, July 1948, beginning at page 599.

The electron speed should be high enough so that the electrons penetrate through any intervening material, for example, part 12, and to and through the adhesive. In activating a sandwich type of bond such as that shown in Fig. 1, the beam will generally be applied perpendicular to the outer surface to provide the least absorption of the electrons by the intervening material and hence to permit operation at minimum voltage. The required voltage may vary widely under different circumstances, particularly upon the thickness and character of the intervening material. We have found voltages from about 0.4 to 3 million volts to be very satisfactory for activation of adhesive beneath leather, but higher or lower voltages may be used as circumstances warrant.

A large number of materials suitable for use as the curable adhesive in carrying out the method of the invention are available on the market. Thus a curable rubber-type adhesive may be employed as more fully disclosed in Example IX below. We have found that an adhesive comprising a polyunsaturated ester of the type disclosed in United States Letters Patent No. 2,155,590, issued April 25, 1939, on an application in the name of Benjamin S. Garvey, such as polyethylene glycol dimethacrylate monomer or the so-called polyester resin adhesives, several examples of which are given below, are quick to cure by polymerization and may be activated by subjecting to a beam of electrons for a period of about one second. The minimum activation time has not been determined, but is probably much less than one second. Because substantially the only heat evolved is the heat of reaction of the adhesive which is quickly lost to the surroundings, the setting of the bond is not delayed, and stress may be applied to the bond practically immediately.

The following examples are given for purposes of illustration to aid in understanding the invention and it is to be understood that the invention is not limited to the specific materials or operating conditions disclosed.

Example I

A piece of calf leather approximately 1½ inches square and 1.1 mm. thick was coated on one side with an adhesive comprising an 85–15 mixture (parts by volume) of Paraplex P–43, a polyester resin adhesive made by Rohm and Haas, Philadelphia, Pa., and VYHH, a vinyl chloride vinyl acetate copolymer made by Carbide and Carbon Chemicals Corporation of New York. A similar piece of leather was placed on top of the coated surface and held under slight pressure while an area of the surface was exposed to a beam of electrons from a microwave cavity type electron accelerator of the type disclosed in the above-mentioned Patent No. 2,582,186, Willshaw giving a pulsed beam of distributed velocity up to 0.630 million volts but with the maximum current at 400 KEV at which voltage the transmission through the leather was about 1.5%. The pulse length was $1 \times 10^{-6}$ second and the pulse rate was 500 P. P. S. The average current density was about 0.3 microamp./cm.$^2$. The strips were held in the beam for about 6½ minutes giving an integrated exposure of about .062 second (allowing a factor of .318 for the sinusoidal pulse). Upon examination, the area subjected to the beam was found to be securely bonded.

Example II

A strip of wood 1.05 mm. thick was coated on one side with an adhesive similar to that of Example I. Another similar strip was placed over the adhesive and the assembly was exposed to the same beam for 6 minutes, slight pressure being applied between the strips. A good bond resulted.

Example III

The procedure of Example II was repeated using Paraplex P–43 alone as the adhesive. A good bond was obtained.

Example IV

A few drops of an adhesive comprising an 80–20 parts by volume mixture of polyethylene glycol 200 dimethacrylate monomer, an ester of methacrylic acid and a glycol (polyethylene glycol 200 obtained from Carbide and Carbon Chemicals Corporation of New York), and VYHH were placed on a leather strip and subjected for two minutes to the beam from the cavity accelerator. The integrated exposure time was thus 0.019 second. The adhesive was converted to a hard mass which adhered firmly to the leather.

Example V

The procedure of Example IV was carried out using a 90–10 parts by volume viscous liquid mixture of Castolite, a polyester resin made by the Castolite Company of Woodstock, Illinois, and VYHH as the adhesive. The adhesive became hard and adhered strongly to the leather.

Example VI

The procedure of Example IV was carried out using each of the following commercial unsaturated polyester resin adhesives in turn as the adhesive: Castolite, Plaskon 920/2 made by Libbey-Owens-Ford Glass Co., Toledo, Ohio, Vibrin 120 and Vibrin 1305 made by Naugatuck Chemical Co., Naugatuck, Connecticut, Paraplex P–43 and P–13 made by Rohm and Haas, and Laminac 4–201 and 4–128 made by American Cyanamid Co., Plastics Division, New York, New York.

The result in each case was solidification of the adhesive and adhesion to the leather.

Example VII

A strip of calf leather 1" x 4" was coated with an adhesive comprising 85 parts by volume of Paraplex P-43 and 15 parts VYHH. Another similar strip was placed over the coated surface, the strips were then pressed together and exposed to a beam of electrons from a direct current accelerator of the type disclosed in the above-mentioned Patent No. 1,991,236, Van de Graaff, said accelerator being located at the Massachusetts Institute of Technology at Cambridge, Massachusetts. This exposure was for the shortest possible time (2±1 seconds) at 1.5 million volts and a current of 100 microamperes total, density about 1.46 microamperes per sq. cm. Upon examination, the strips were bonded securely together.

Example VIII

An adhesive setting composition similar to that of Example VII was placed along the trimmed rib and upper at the toe end of a lasted man's shoe whose upper was temporarily secured in place by a toe wire. The shoe was placed bottom up on a fixed-speed conveyor belt associated with the Massachusetts Institute of Technology accelerator and thereby moved at 0.4 inch per second through a beam of 3 million volts and 100 microamperes for an exposure of about 10 seconds. Upon examination the setting composition was well activated and from the lasting viewpoint, the upper leather, intervening liners, box toe material and insole rib were all well secured together.

Example IX

A rubber type adhesive was prepared comprising a solution in 450 parts by weight of toluene, of 100 parts of the mixture:

| | Parts by weight |
|---|---|
| Smoked natural No. 1 rubber sheet | 100.0 |
| Zinc oxide | 6.0 |
| Sulphur | 4.5 |
| Captax (mercaptobenzothiazole) | 0.5 |
| Butyl zimate (zinc dibutyldithiocarbamate) | 0.25 |
| Stearic acid | 4.0 |

Two leather strips ¾ inch wide, 3 inches long and .040 inch thick were each coated on one side with the adhesive, four coats in all being applied to each strip. After the last coat had dried but was still slightly tacky, the strips were pressed together and a portion of the adhesive at one end, approximately ⅜ inch in diameter, was subjected to the beam from the cavity accelerator.

After activation, the strips were placed in the Instron tester and pulled. The standard peel pull of the unexposed portions was 3⅔ pounds per inch while the pull of the strip at the exposed portion was 13⅓ pounds per inch (i. e. about 27 pounds for a 1" strip activated its full width).

Example X

An adhesive was prepared from 100 parts by weight of GR-S dissolved in 450 parts of toluene. Two coats were applied to ¾" leather strips with drying of each coat for about two minutes. The strips were pressed together and a spot about ½" in diameter near one end was subjected to the pulsed beam from the cavity activator for an hour. The strips were then pulled, beginning at the far end. The pull registered about 2 pounds per inch pounds until the activated area was reached. The pull in this area was about 12 pounds per inch.

While we have disclosed the use of an electron beam to activate the adhesive in carrying out our method, it will be appreciated that the adhesive may be subjected for activation purposes to other forms of materialistic radiation in the nature of X-rays, gamma rays, protons, deuterons, neutrons, ions and alpha particles.

Having thus described our invention, what we claim as new and desire to secure by Letters Patent of the United States is:

1. The method of adhesively bonding two parts which comprises the steps of incorporating a curable adhesive between and connecting the attaching surfaces of the parts, and activating the adhesive by subjecting it to materialistic radiation to cause the adhesive to cure.

2. The method of claim 1 in which the adhesive is curable through polymerization.

3. The method of adhesively bonding parts which comprises incorporating a curable adhesive between and connecting the attaching surfaces of the parts to be joined, and activating the adhesive by subjecting it to material radiation to cause the adhesive to cure.

4. The method of claim 3 in which the material of the radiation is electrons.

5. The method of adhesively bonding parts which comprises the steps of incorporating a curable adhesive between and connecting the attaching surfaces of the parts to be joined, and activating the adhesive by directing a beam of materialistic radiation against the outer surface of one part to penetrate through the part into the adhesive thereby to cause the adhesive to cure.

6. The method of claim 5 wherein the radiation is material radiation.

7. The method of claim 6 wherein the material of the radiation is electrons.

8. The method of adhesively bonding parts which comprises the steps of incorporating an unsaturated ester adhesive between and connecting the attaching surfaces of the parts to be joined, and activating the adhesive by subjecting it to materialistic radiation.

9. The method of adhesively bonding parts which comprises the steps of incorporating an unsaturated ester adhesive between and connecting the attaching surfaces of the parts to be joined and directing a beam of rapidly moving atomic particles against and through one of said parts and into the adhesive to initiate a polymerization reaction thereof.

10. The method of claim 9 wherein the atomic particles are electrons.

11. The method of adhesively bonding parts which comprises the steps of incorporating an adhesive curable through polymerization between and connecting the attaching surfaces of the parts to be joined, and activating the adhesive by subjecting it to material radiation for polymerization of the adhesive.

12. The method of claim 11 wherein the material of the radiation is electrons.

JOHN J. BROPHY.
ROBERT R. PERRON.

References Cited in the file of this patent

UNITED STATES PATENTS

| Number | Name | Date |
|---|---|---|
| 2,461,372 | Collins | Feb. 8, 1949 |
| 2,575,251 | Arnold | Nov. 13, 1951 |